United States Patent
Donahue et al.

(10) Patent No.: US 7,313,606 B2
(45) Date of Patent: Dec. 25, 2007

(54) SYSTEM AND METHOD FOR AUTOMATIC CONFIGURATION OF A BI-DIRECTIONAL IP COMMUNICATION DEVICE

(75) Inventors: David B. Donahue, Mountain View, CA (US); Benn Bollay, San Francisco, CA (US)

(73) Assignee: The DIRECTV Group, Inc., El Segundo, CA (US)

( * ) Notice: Subject to any disclaimer, the term of this patent is extended or adjusted under 35 U.S.C. 154(b) by 559 days.

(21) Appl. No.: 09/996,276

(22) Filed: Nov. 27, 2001

(65) Prior Publication Data

US 2003/0101243 A1 May 29, 2003

(51) Int. Cl.
*G06F 15/177* (2006.01)

(52) U.S. Cl. ............... 709/220; 709/221; 709/227; 709/228

(58) Field of Classification Search ........ 709/220–222, 709/226–228
See application file for complete search history.

(56) References Cited

U.S. PATENT DOCUMENTS

| | | | | |
|---|---|---|---|---|
| 6,049,826 A * | 4/2000 | Beser | ............. | 709/222 |
| 6,085,245 A * | 7/2000 | Kaycee et al. | ............. | 709/224 |
| 6,345,294 B1 * | 2/2002 | O'Toole et al. | ............. | 709/222 |
| 6,427,170 B1 * | 7/2002 | Sitaraman et al. | ............. | 709/226 |
| 6,452,925 B1 * | 9/2002 | Sistanizadeh et al. | ........ | 370/352 |
| 6,529,479 B1 * | 3/2003 | Suzuki | ............. | 370/236.1 |
| 6,603,769 B1 * | 8/2003 | Thubert et al. | ............. | 370/401 |
| 6,665,713 B1 * | 12/2003 | Hada et al. | ............. | 709/220 |
| 6,678,721 B1 * | 1/2004 | Bell | ............. | 709/209 |
| 6,697,852 B1 * | 2/2004 | Ryu | ............. | 709/220 |
| 6,700,955 B1 * | 3/2004 | Davis et al. | ............. | 379/90.01 |
| 6,728,232 B2 * | 4/2004 | Hasty et al. | ............. | 370/338 |
| 6,732,166 B1 * | 5/2004 | Woodruff | ............. | 709/221 |
| 6,738,470 B1 * | 5/2004 | Aronovitz | ............. | 379/220.01 |
| 6,754,318 B2 * | 6/2004 | Oksman et al. | ............. | 379/93.28 |
| 6,778,505 B1 * | 8/2004 | Bullman et al. | ............. | 370/254 |
| 6,778,542 B1 * | 8/2004 | Hassan-Ali et al. | ........ | 370/401 |
| 6,854,009 B1 * | 2/2005 | Hughes | ............. | 709/220 |
| 6,874,041 B1 * | 3/2005 | Burd et al. | ............. | 710/38 |
| 6,985,565 B2 * | 1/2006 | Oksman et al. | ............. | 379/93.28 |
| 6,993,048 B1 * | 1/2006 | Ah Sue | ............. | 370/493 |
| 6,996,628 B2 * | 2/2006 | Keane et al. | ............. | 709/238 |
| 7,035,257 B2 * | 4/2006 | Vafaei | ............. | 370/389 |
| 7,039,688 B2 * | 5/2006 | Matsuda et al. | ............. | 709/220 |

(Continued)

OTHER PUBLICATIONS

Microsoft:Corp. (2002). Computer Dictionary (5th ed.). Redmond, WA: Microsft Press.*

*Primary Examiner*—Saleh Najjar
*Assistant Examiner*—Faruk Hamza (57) ABSTRACT

During manufacturing, a unique bi-directional IP communication device identifier, such as a gateway serial number, is assigned to a each bi-directional IP communication device, preferably a DSL gateway. Once an order for such a device is received from a user, the unique bi-directional IP communication device identifier is associated with the unique user that the device is shipped to. A request for basic configuration details is then broadcast, preferably to a DHCP server. The request contains the unique bi-directional IP communication device identifier. The user's basic configuration details are then determined based on the unique bi-directional IP communication device identifier. These basic configuration details, which preferably include an IP address, are then received from the DHCP server. The bi-directional IP communication device is then configured with these basic configuration details.

25 Claims, 6 Drawing Sheets

U.S. PATENT DOCUMENTS

7,046,675 B2 * 5/2006 Lund ....................... 370/395.2
7,047,304 B2 * 5/2006 Senapati et al. ............ 709/229

2002/0004935 A1 * 1/2002 Huotari et al. ................ 717/11

* cited by examiner

SYSTEM AND METHOD FOR AUTOMATIC CONFIGURATION OF A BI-DIRECTIONAL IP COMMUNICATION DEVICE

BACKGROUND OF THE INVENTION

1. Field of the Invention

The present invention relates generally to broadband telecommunications, and particularly to a system and method for automatic configuration of a Bi-directional Internet Protocol (IP) communication device, such as a DSL gateway or modem.

2. Description of Related Art

While high-speed Internet connections to large businesses have been in existence for quite some time, high speed Internet connections to homes and small businesses have only recently become more commonplace. Bi-directional IP communication technologies such as ISDN (Integrated Services Digital Network), Cable, Satellite, and DSL (Digital Subscriber Line), are all competing for market share. The two technologies at the forefront, DSL and Cable, offer much faster Internet access than dial-up modems, for a cost substantially lower than ISDN.

Analog modems over regular telephone lines are not fast enough for today's broadband multi-media content. In fact, so-called 56 Kbps modems actually move data at approximately 44 Kbps because of telephone-line imperfections. Furthermore, these modems only reach that speed when receiving data, not sending it.

Basic ISDN transfers data at 56 Kbps, while an improved form of ISDN has a maximum speed of 128 Kbps. ISDN is, however, expensive, running up to several hundreds of dollars a month. Furthermore, ISDN is only approximately four times the speed of a 33.6 Kbps modem.

Another option, satellite, which uses the same type of mini-dish antenna typical of broadcast television can receive data at up to 400 Kbps. However, transmitted data still has to be sent through a traditional analog modem at 33.6 Kbps or 56 Kbps.

Cable modems, enable one to hook up a PC to a local cable television line and receive data at about 1.5 Mbps. This data rate far exceeds that of both 56 Kbps analog modems, and the 128 Kbps of ISDN. The actual bandwidth for Internet service over a cable TV line is up to 27 Mbps for receiving data, and up to about 2.5 Mbps of bandwidth for transmitting data. However, since the local provider may not be connected to the Internet on a line faster than a T-1 at 1.5 Mbps, a more likely data rate will be closer to 1.5 Mbps. Cable, however, suffers the drawback that it is carried on existing cable television lines, which not all homes, and especially not all small businesses are equipped with. Furthermore, available bandwidth is shared with other cable users in the same geographic area.

DSL, on the other hand, is 20 times faster than satellite connections, 60 times faster than ISDN, and 250 times faster than 33.6 Kbps analog modems. DSL, as used herein, refers to different variations of DSL, such as ADSL (Asymmetric Digital Subscriber Line), HDSL (High bit-rate Digital Subscriber Line), and RADSL (Rate Adaptive Digital Subscriber Line).

Assuming that the location of one's home or business is close enough to a telephone company central office that offers DSL service, one can receive data at rates up to 6.1 megabits (millions of bits) per second. More typically, individual connections will provide from 1.544 Mbps to 512 Kbps downstream and about 128 Kbps upstream. Best of all, those bits are transmitted via the same copper wire one uses for telephone calls, but without the complex setup of ISDN. DSL does this by taking advantage of unused frequencies that exist on standard telephone lines. An added advantage is that the original POTS (plain-old telephone service) frequencies remain free to handle voice traffic over the same copper wires. Yet another advantage is that one does not share the line with others in the same geographical area. Within a few years, DSL is expected to replace ISDN in many areas and to compete with the cable modem in bringing multimedia to homes and small businesses around the world.

One of the major problems facing the rollout of DSL connections is the cost and complexity of initial setup of a DSL gateway (or modem) at a remote location. This is because most DSL technologies require a manual configuration of the gateway and client computer at a home or business, requiring the expense of a visit by a technician to the remote location for setup of the telephone line and installation and configuration of the DSL gateway and client computer. It has been estimated, that a typical service call to install and configure a DSL gateway, currently costs in the region of $300 for the DSL service provider.

The use of signal splitters has reduced the cost of rolling out DSL service, as they reduce the complexity of initial setup for DSL consumers. A signal splitter is a device for isolating voice and data signals transmitted on normal analog telephone wires. The splitter, essentially, comprises a low pass filter that differentiates between data and voice signals. As most homes and offices have at least two pairs of twisted copper wires (hereafter "twisted pairs"), the splitter typically divides data to an outer pair of the wires and voice to an inner twisted pair of the wires. Therefore, voice communication devices can only be plugged into communication-jacks that connect to the inner twisted pair, and data communication devices can only be plugged into communication-jacks that are connected to the outer twisted pair. The DSL consumer, however, must ensure that the correct devices are plugged into the correct communication-jacks, and ensure that line converters are installed between the devices and the communication-jacks to switch inner and outer pairs, if necessary.

More recently, micro-filters or μfilters for splitting data and voice signals have been developed. These μfilters are also low pass filters that are placed between each POTS device and a regular telephone jack. The μfilters, therefore, allow two copper wires to be utilized instead of four, as there is no division of data and voice at a central splitter. A typical double twisted pair analog telephone line can, therefore, support two independent data and/or voice communication lines.

However, even with the above described advances, DSL consumers typically still have to configure their DSL gateways themselves. Typically, the consumer must manually enter configuration information, such as their telephone numbers and other information supplied by the DSL service provider, into their client computers. In addition, the DSL service provider also typically spends a substantial amount of resources providing telephone assistance to talk DSL consumers through the installation and configuration process. Often, the service provider still needs to send technicians out to the consumer to install and configure the DSL system. This process is both costly and time consuming.

A need therefore exists for an automatically configurable DSL gateway that can be installed by a consumer with little, or no, technical skill or know-how.

SUMMARY OF THE INVENTION

According to the invention there is provided a method for the automatic configuration of a bi-directional Internet Protocol (IP) communication device. In a preferred embodiment the bi-directional IP communication device is a DSL gateway. During manufacturing, a unique bi-directional IP communication device identifier, such as a gateway serial number, is assigned to a each bi-directional IP communication device, preferably a DSL gateway. Once an order for such a device is received from a user, the unique bi-directional IP communication device identifier is associated with the unique user that the device is shipped to. A request for basic configuration details is then broadcast, preferably to a DHCP server. The request contains the unique bi-directional IP communication device identifier. The user's basic configuration details are then determined based on the unique bi-directional IP communication device identifier. These basic configuration details, which preferably include an IP address, are then received from the DHCP server. The bi-directional IP communication device is then configured with these basic configuration details.

The automatic configuration minimizes user interaction with the bi-directional IP communication device. The only action required by the user is connecting the DSL gateway to a DSL ready telephone line.

The benefits of such an automatic configuration include:
Drastically reducing the frequency of service calls by technicians;
The ability to easily determine if incoming technical service calls relate to DSL network provisioning issues or client computer configuration/device driver issues;
True "plug and surf" DSL operation for client computer configurations that include Ethernet capability;
The ability to use networked devices, such as an X10 camera, without requiring the use of a client computer;
Reducing installation and documentation complexity;
Reduction of costs;
Less delays for consumers; and
Speedier and scalable DSL rollout for DSL service providers.

BRIEF DESCRIPTION OF THE DRAWINGS

Additional objects and features of the invention will be more readily apparent from the following detailed description and appended claims when taken in conjunction with the drawings, in which:

Like reference numerals refer to corresponding parts throughout the several views of the drawings.

DESCRIPTION OF THE PREFERRED EMBODIMENTS

For ease of explanation the following description and drawings represent a DSL system. It should, however, be clear to those skilled in the art that the present invention may be embodied in any a Bi-directional IP communication system without departing from the spirit and scope of the present invention as defined in the accompanying claims. Such a Bi-directional IP communication system includes the use of a Bi-directional IP communication device, such as a DSL gateway, cable modem, or the like.

Reducing the number of user interactions during an installation and configuration, leads to a reduction of the number of technical support calls, improved product quality and increased customer satisfaction. This invention attempts to address all customer installation steps except for the connecting of cables.

Figure 1:
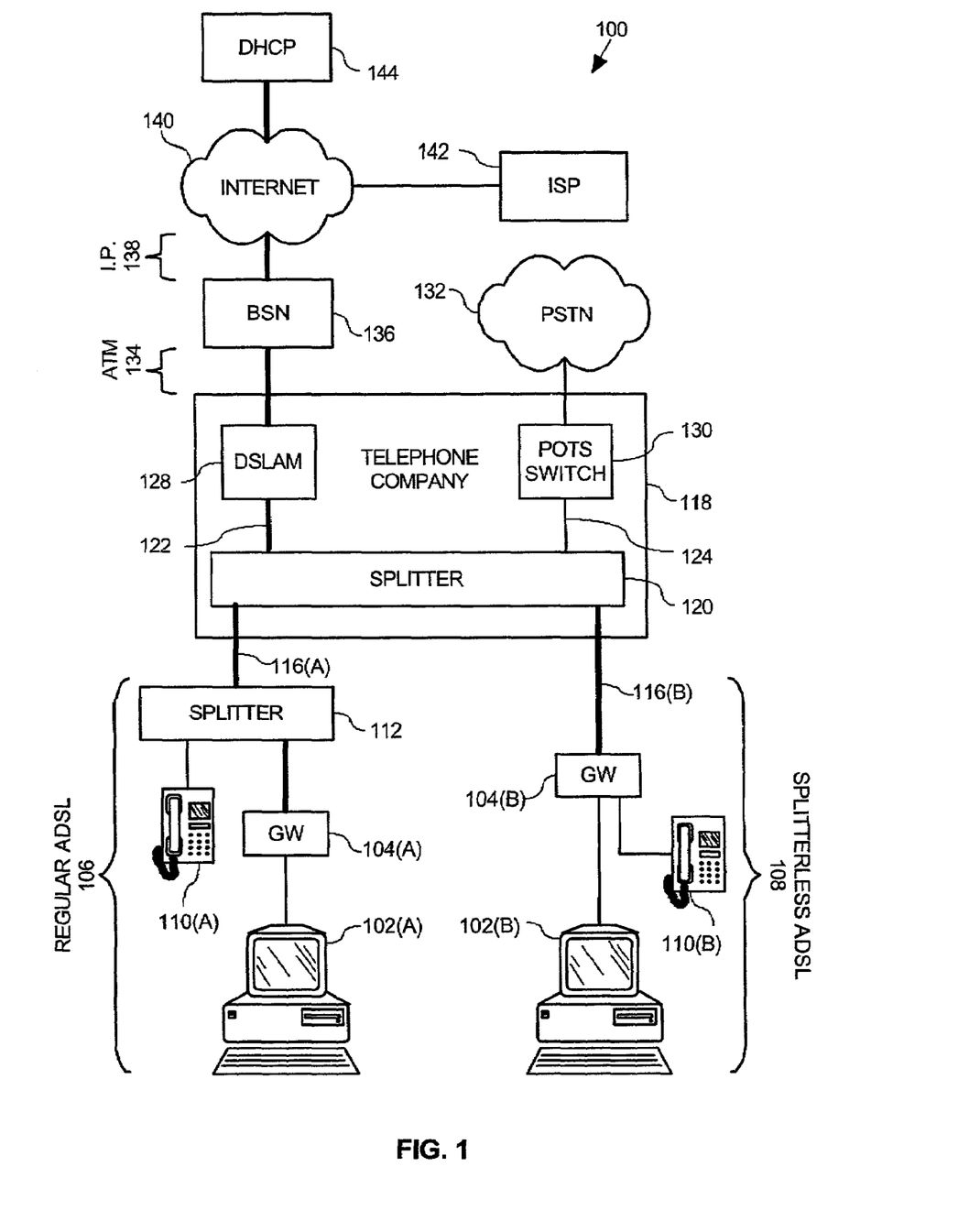
FIG. 1 is a diagrammatic view of the system architecture according to an embodiment of the invention.

FIG. 1 is a diagrammatic view of the system architecture 100 according to an embodiment of the invention. Traditional telephone services, otherwise known as Plain Old telephone Systems (POTS) connect homes or small businesses to a telephone company office 118 over copper wires or twisted pairs 116 (A) and 116(B). Traditional telephone services allow for the exchange of voice communication with other telephone users using an analog signal. An analog input device (POTS device), such as a telephone set 110(A) or 110(B), takes an acoustic signal (which is a natural analog signal) and converts it into an electrical equivalent in terms of volume (signal amplitude) and pitch (frequency of wave change).

Because analog transmission only uses a small portion of the available amount of information that can be transmitted over copper wires, the maximum amount of data that can be received using ordinary analog modems is about 56 Kbps. The ability of a computer to receive information is constrained by the fact that the telephone company filters information that arrives as digital data, puts it into analog form for the telephone line, and requires the modem to convert it back into a digital signal. In other words, the analog transmission between a home or business and the telephone company is a bandwidth bottleneck.

DSL does not convert the digital data into analog form and back again. Digital data is transmitted directly to a client computer, allowing the telephone company to use a much wider bandwidth for transmission. DSL allows the signal to be separated so that some of the bandwidth is used to transmit an analog signal, such that use of a telephone and computer on the same line, and at the same time, can occur simultaneously.

Currently, there are two basic types of DSL systems, namely regular ADSL 106 and splitterless ADSL 108. Asymmetric DSL (ADSL) is for Internet access, where fast downstream is required, but slow upstream is acceptable. Symmetric DSL (SDSL, HDSL, etc.) is designed for short haul connections that require high speed in both directions. Unlike ISDN, which is also digital but travels through the switched telephone network, DSL provides "always-on" operation.

Asymmetric DSL shares the same line as the telephone, because it uses higher frequencies than the voice band. However, a POTS splitter 112 must be installed on the customer's premises to separate the line between voice and data. Splitterless ADSL, known as G.lite, Universal ADSL, ADSL Lite, is geared to the consumer by eliminating the splitter and associated installation charge. All telephones on the telephone line must, however, plug into low-pass filters to isolate them from the higher ADSL frequencies.

The copper twisted pairs 116(A) or 116(B) leaving a home or business connect to a telephone company's central office 118, currently, up to 18,000 feet (Approximately 5.5 Km)

away. A splitter 120, at the telephone company's central office 118, separates voice calls 124 from data 122. Voice calls 124 are routed by a POTS switch 130 to the a public switched telephone network (PSTN) 132 and thereafter are switched to their destination.

Regular ADSL 106 transmits data 122 from a client computer 102(A) to a DSL gateway 104(A). A splitter 112 then differentiates between voice and data. Voice travels on the first 4 kHz of frequency, while the higher frequencies, up to 2 MHz depending on line conditions and wire thickness, are used for data. Once the splitter 112 has differentiated between voice and data, the data are then transmitted to the telephone company's central office 118 over the twisted pair 116(A). Splitterless ADSL 108 transmits data 122 from a client computer 102(B) to a DSL gateway 104(B). The DSL gateway then sends the data signal to the telephone company's central office 118 over the twisted pair 116(B).

Once the data is received at the telephone company's central office 118, a splitter 120 directs the data signal 122 to a Digital Subscriber Line Access Multiplexer (DSLAM) 128. The DSLAM 108 links multiple DSL gateways through a single high-speed asynchronous transfer mode (ATM) network 134 to a Broadband Service Node (BSN) 136. An ATM network is a dedicated-connection switching technology that organizes digital data into 53-byte cells or packets and transmits them using digital signal technology. The BSN 136 allows service providers to aggregate tens of thousands of subscribers onto one platform and apply highly customized Internet Protocol (IP) services to these subscribers. The BSN enables service providers to seamlessly migrate from basic broadband subscriber aggregation to more profitable value-added services while providing scalable operations. BSNs are deployed preferably at all Points of Presence (POPs). A suitable BSN is the SHASTA 5000 made by NORTEL NETWORKS.

The BSN 136 then routes the data signal, at speeds up to 1 Gbps, over an IP network 138 to the Internet 140. In a converse manner, data requested by the client computer 102(A) or 102(B) is retrieved from the Internet 140 and routed back through the DSLAM 128 and DSL gateway 126 at the telephone company's central office 118 before arriving at the user's home or office.

Also connected to the Internet 140 is the DSL service provider or Internet Service Provider (ISP) 142, which provides the DSL service, and at least one Dynamic Host Configuration Protocol (DHCP) server 144. The DHCP server 144 is a server that automatically provides basic configuration details, such as IP addresses, to the client computers 102(A) or 102(B) logging onto a Transmission Control Protocol/Internet Protocol (TCP/IP) network, such as the Internet. The DHCP server 144 eliminates having to manually assign permanent IP addresses to the client computers 102(A) and 102(B).

As described above, historically, the DSL gateway 104(A) or 104(B) was initially configured by sending a technician out to the user to configure the user's DSL gateway and client computer 102(A) or 102(B). However, a number of automatic or semiautomatic processes have been developed to allow users to configured their DSL gateways and client computers themselves. One such process is disclosed in U.S. patent application Ser. No. 09/668,623, entitled "System and Method for Auto-Configuration of a DSL Modem" and filed on Sep. 22, 2000, which is hereby incorporated by reference.

These automatic or semiautomatic processes typically require users to load proprietary software onto their client computers and supply some sort of user identifier, such as the user's telephone number to the proprietary software. The ISP requires a user identifier so that it can determine the appropriate configuration for a specific user, as different users may have different service plans. For example, each user may have multiple IP addresses, etc.

U.S. patent application Ser. No. 09/668,623 discloses a means for automatically configuring DSL communication between the DSL gateway and a DHCP server. The disclosed process works essentially as follows. The DSL gateway is connected to an analog telephone line, and the DSL gateway is turned on. The DSL gateway includes a static list of Virtual Path Identifier/Virtual Channel Identifier (VPI/VCI) pairs used for routing information in an ATM network. An ATM protocol, used to communicate between the DSLAM 128 and the BSN 136, breaks up data into packets or cells having 53 bytes each. The cells carry an information payload of 48 bytes and a 5 byte header containing various fields. One of these fields is the VPI/VCI fields. Each transmission path, on the ATM network, is made up of multiple virtual paths, and each virtual path is made up of multiple virtual circuits. The VCI is used to establish connections using translation tables at switching nodes that map an incoming VCI to an outgoing VCI. Circuits established using a VCI connection are referred to as virtual circuits, and a VCI's end-to-end connection is called a virtual connection. The VPI is used like a VCI to establish a virtual path connection for one or more logically equivalent VCIs in terms of route and service characteristics. The VPI is used in setting up the end-to-end virtual path connection of multiple virtual path segments, where each virtual path contains multiple virtual channels. This static list of VPI/VCI pairs is determined by the list of VPI/VCI pairs that a local DSLAM can be configured with.

Some Competitive Local Exchange Carriers (CLECs), which are organizations offering local telephone services, or Incumbent Local Exchange Carriers (ILECs), which are traditional local telephone company such as one of the Regional Bell companies (RBOCs), such as PACIFIC BELL, assign a unique VPI/VCI pair to each telephone line or circuit in their system.

When the CLEC and/or ILEC provisions a local telephone line or circuit for DSL service on behalf of the ISP, and ultimately on behalf of the user, they assign a specific VPI/VCI pair for a particular user. The specific VPI/VCI pair is then communicated to the ISP. In this way the ISP can associate specific users with a specific VPI/VCI pair. When the DSL gateway makes its first contact with the DHCP server it uses the VPI/VCI pair assigned to it by the CLEC/ILEC. This VPI/VCI pair is identified by the DHCP server, which compares the identified VPI/VCI pair to a list of known VPI/VCI pairs and a corresponding list of known users to determine the precise configuration settings for that particular user. Once a configuration request is identified as coming from a particular user, that user's specific configuration settings are transmitted to the user's DSL gateway.

However, the above described system only works for CLECs and/or ILECs that use unique VPI/VCI pairs for each individual circuit. In CLECs and/or ILECs that do not use unique VPI/VCI pairs, such as BELL ATLANTIC, the DHCP server is unable to determine which user is making the configuration request, as the same VPI/VCI pair is used by multiple client computers. To address this problem, prior art systems use a user identifier, such as the user's telephone number supplied by each user to determine which specific user is requesting the configuration settings. Once the client computer 102(A) or 102(B) has been connected to the DSL gateway 104 (A) or 104 (B) and the gateway connected to the telephone line or circuit, the user installs proprietary software, supplied by the ISP, onto the client computer. The proprietary software requests and obtains a user identifier, such as the user's telephone number, from the user. Once the user identifier is obtained, the client computer sends a DHCP request to the DHCP server 144, where the request includes the user identifier.

The DHCP server then attempts to locate particular configuration details for the matching service provider side VPI/VCI or, if supplied, user identifier. If the VPI/VCI is unique, a temporary IP address, such as 10.255.255.254, is sent to the client computer. If the VPI/VCI pair is not unique and there is no match for the supplied user identifier, such as where an incorrect user identifier is supplied, the DSL gateway's alarm light would activate, thereby, informing the user that he or she should contact the service provider for help. If, however, a unique match is found for the user identifier, the DHCP server 144 sends the user's particular configuration details to the user's DSL gateway.

The above described system, however, requires the users to supply a user identifier, such as a telephone number, to the client computer and DSL gateway, before the DSL gateway can make a request for configuration settings. A major disadvantage of this system is that users frequently call ISP's support lines with problems relating to the installation and configuration of software and the configuration of their DSL gateways. True "plug and surf" DSL operation is not provided, as the user must first load the proprietary software onto his/her client computers and then supply his/her user identifier, before being able to connect to the Internet. This added complexity is both time consuming and costly. Therefore, a system that reduces the complexity of DSL gateway installation and configuration has been developed.

The method for automatic configuration of a DSL gateway according to the invention, utilizes the system architecture described above in relation to FIG. 1. Individual components of the system 100 will now be described.

Figure 2:
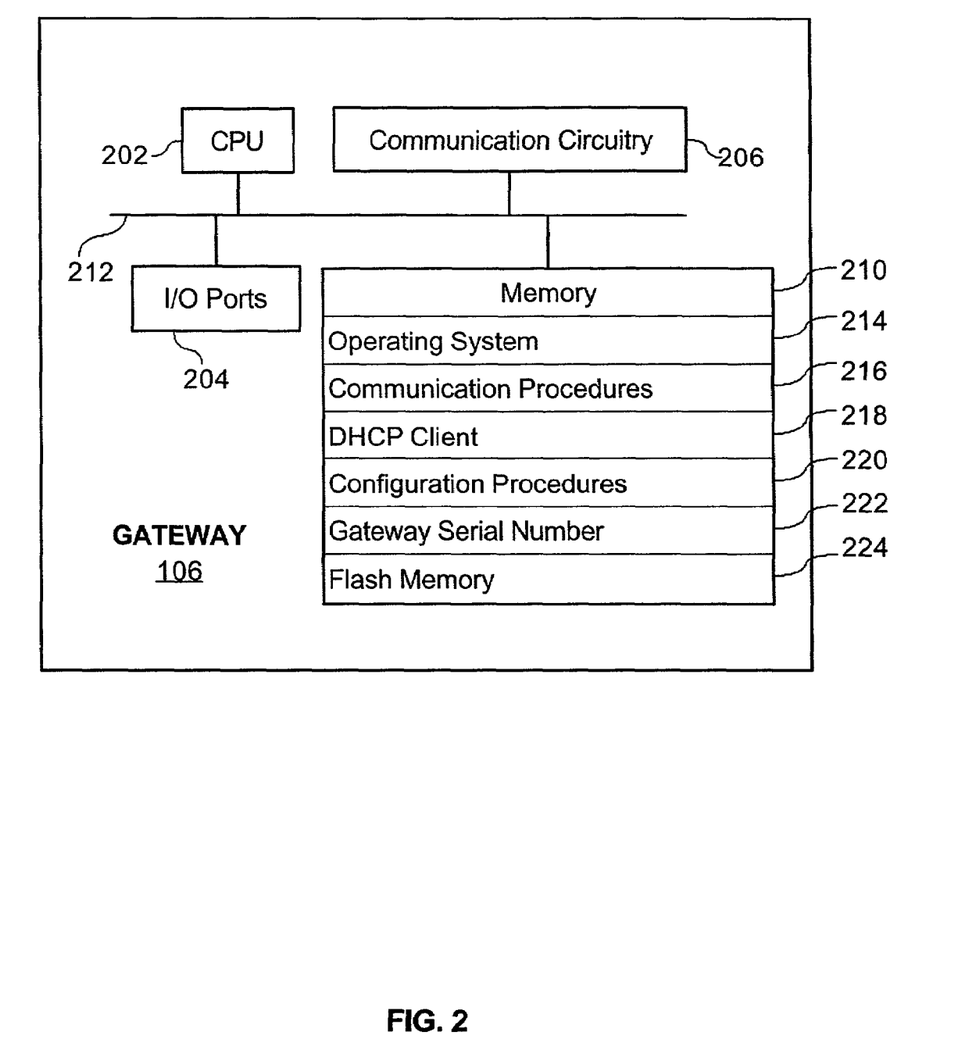
FIG. 2 is a diagrammatic perspective view of the DSL gateway shown in FIG. 1.

FIG. 2 is a block diagram of the client-side DSL gateway 104(A) or 104(B) shown in FIG. 1. The DSL gateway 104 preferably comprises at least one data processor or central processing unit (CPU) 202, a memory 210, communication circuitry 206, input and output ports 204 that connect the DSL gateway 104 to the client computer 102 (FIG. 1) and the circuit or telephone line 116 (FIG. 1), and at least one bus 212 that interconnects these components.

Memory 210 preferably includes an operating system 214, such as VXWORKS™, or EMBEDDED LINUX™, which stores instructions for processing data, accessing data, storing data, searching data, etc. Memory 210 also preferably includes communication procedures 216, a Dynamic Host Configuration Protocol (DHCP) client 218, configuration procedures 220, a gateway serial number 224 (either hard or soft coded), and flash memory 224.

The communication procedures 216 are used for communicating with the client computer 102 (FIG. 1) and the DSLAM 128 (FIG. 1). The DHCP client 218 automatically requests an IP address from a DHCP server in a TCP/IP network. It eliminates having to manually assign permanent IP addresses. The configuration procedures 220 are used to automatically configure the DSL modem.

Figure 3:
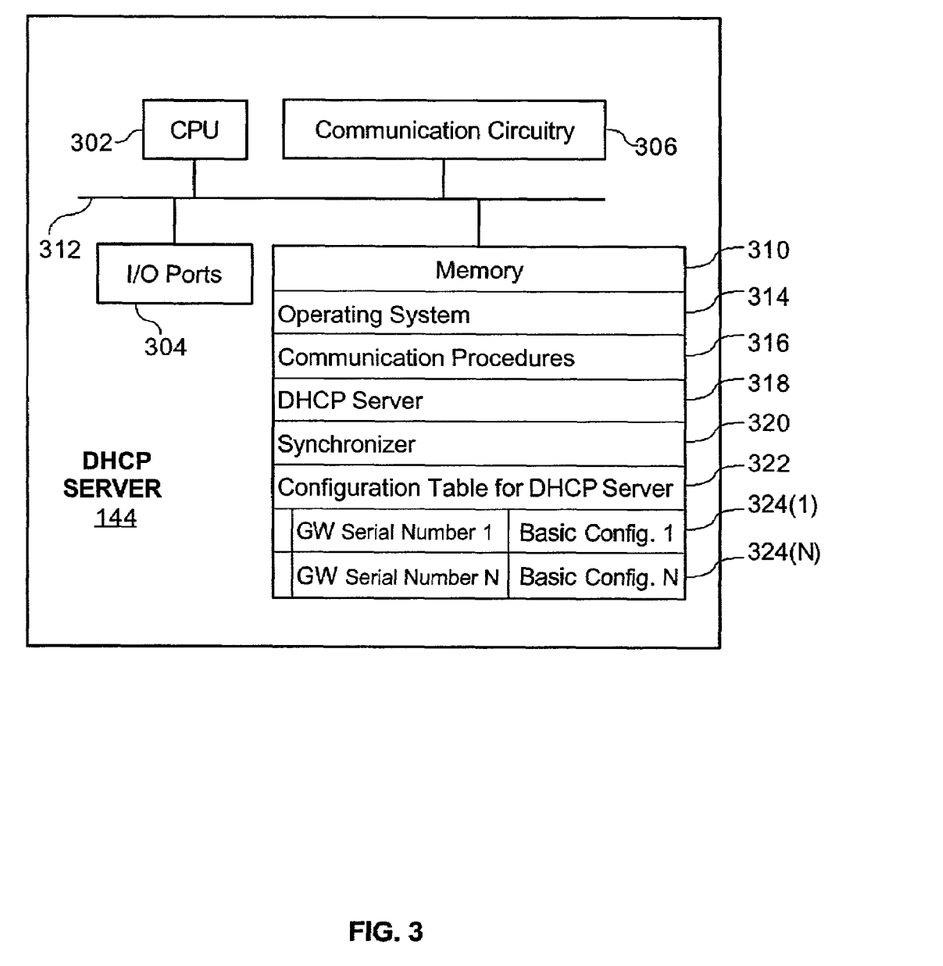
FIG. 3 is a diagrammatic view of the memory within the DSL gateway shown in FIG. 2.

FIG. 3 is a block diagram of the DHCP server 144 shown in FIG. 1. The DHCP server 144 preferably comprises at least one data processor or central processing unit (CPU) 302, a memory 310, communication circuitry 306, input and output ports 304 that connect the DHCP server 144 to the Internet, and at least one bus 312 that interconnects most of these components.

Memory 310 preferably includes an operating system 214, such as, such as VXWORKS™, or EMBEDDED LINUX™, which stores instructions for processing data, accessing data, storing data, searching data, etc. Memory 310 also preferably includes communication procedures 316, a DHCP server 318, a synchronizer 320, and a configuration table for the DHCP server 322.

The communication procedures 216 are used for communicating with the remainder of the system. The DHCP server 218 automatically assigns IP addresses using the configuration table for the DHCP server 322 to lookup unique basic configuration details for each unique gateway based on the gateway's serial number 324(1)-(N). The synchronizer 320 is used to synchronize the configuration table 322 with updates serial numbers and configuration details.

A suitable DHCP server 144 is a SUN MICROSYSTEMS server using SOLARIS OS. Suitable DHCP procedures 318 are provided by INTERNET SOFTWARE CONSORTIUM (ISC).

Figure 4A:
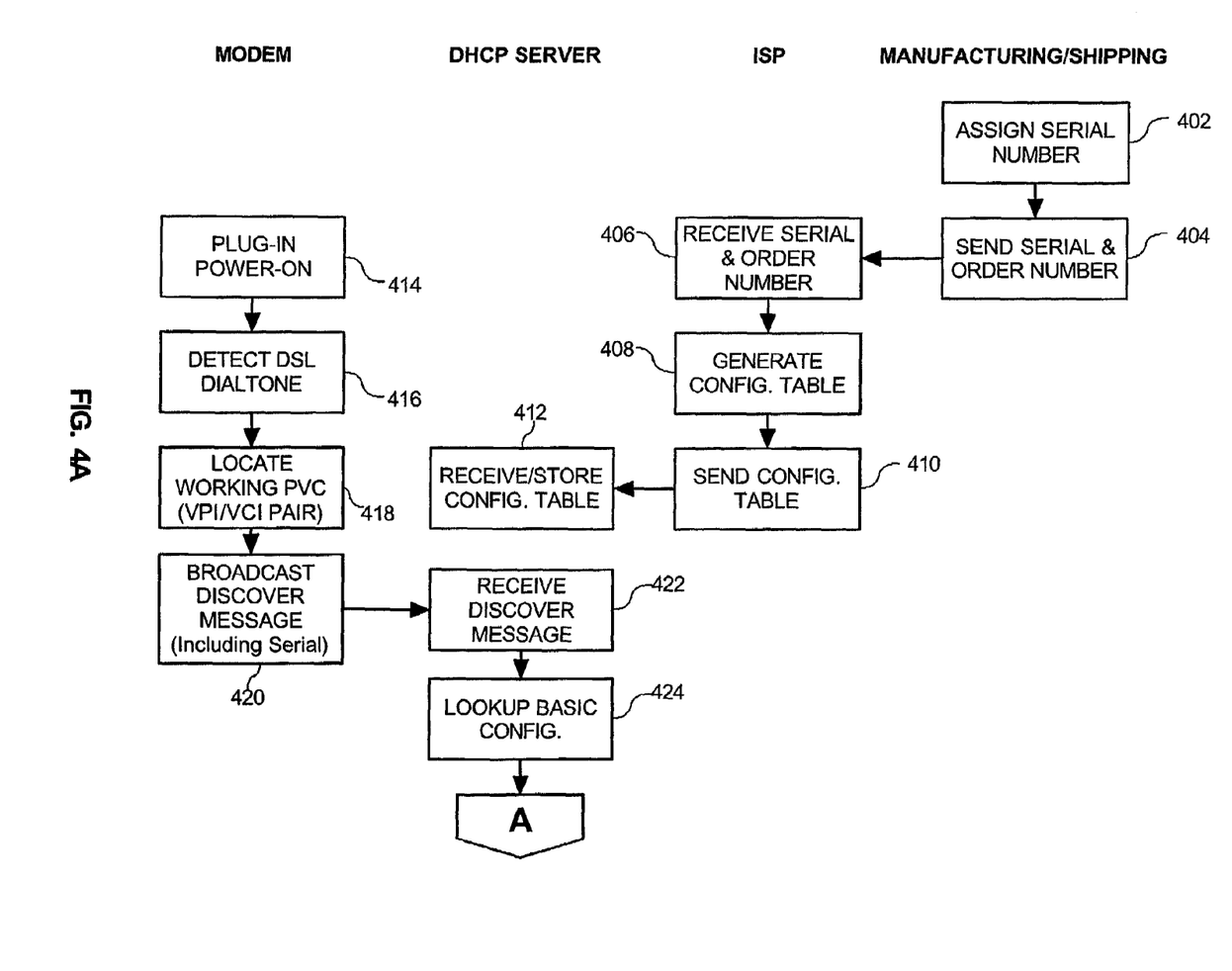
FIGS. 4A and 4B are flow charts of a method of automatically configuring a DSL gateway according to an embodiment of the invention.
Figure 4B:
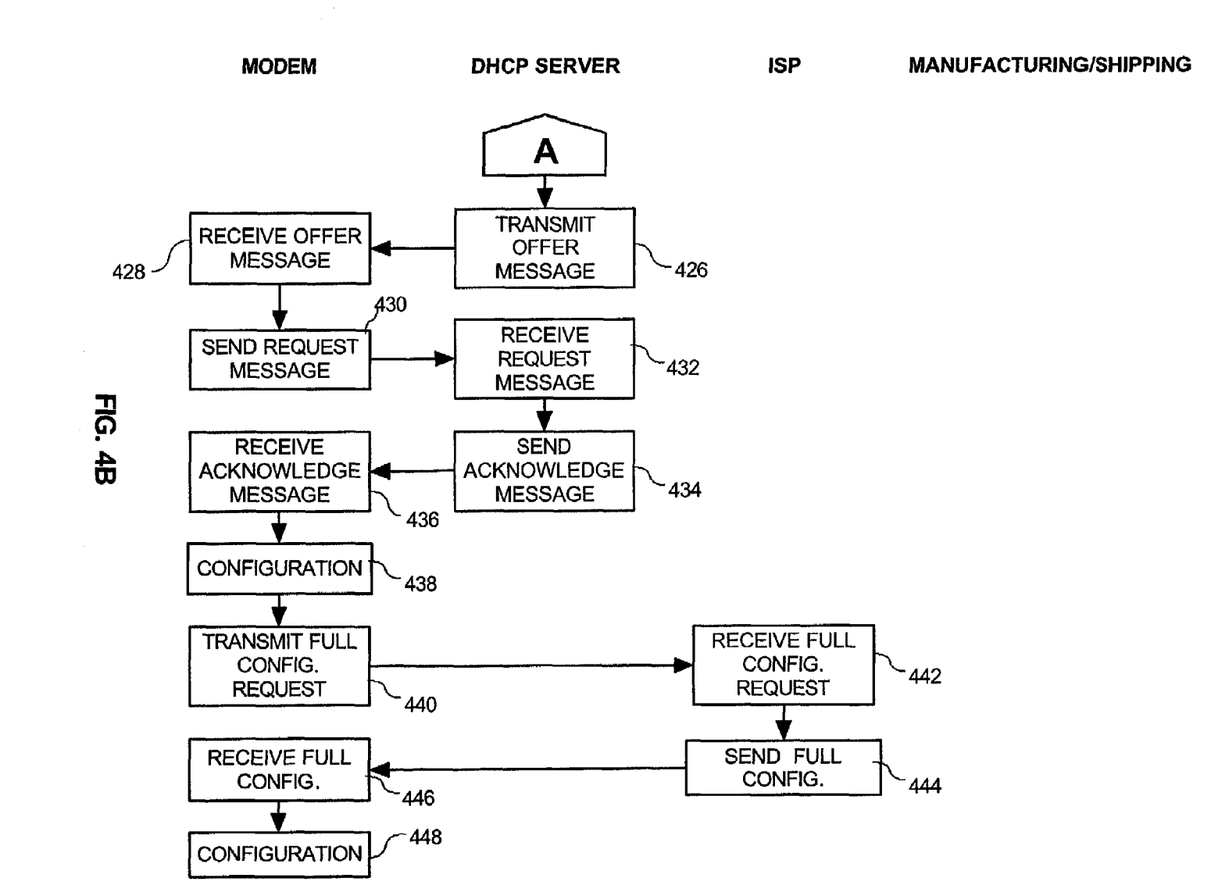

FIG. 4 are flow charts of a method of automatically configuring a DSL gateway 100 (FIG. 1) according to an embodiment of the invention. After manufacture, preferably while the DSL gateway is still at manufacturing, a serial number 224 (FIG. 2) is assigned 402 to each DSL gateway and hard or soft coded, i.e., stored, in the DSL gateway's memory 210 (FIG. 2). Manufacturing also preferably places a bar code of the serial number on the outside of each DSL gateway's box. Once an order is received from a user for a DSL gateway, the bar coded serial number is scanned and the particular DSL gateway is associated with a particular order number, and hence user. The DSL gateway is then shipped to the user.

The serial number and associated order number is subsequently sent 404 to the ISP. The ISP receives 406 the serial number and order number, and generates 408 a configuration table 322 (FIG. 3) listing DSL gateway serial numbers and their associated users. The configuration table is periodically sent 410 to the DHCP server 144 (FIG. 1), which receives and stores 412 the configuration table 322 (FIG. 3) in its memory 310 (FIG. 3). This is preferably performed by the synchronizer 320 (FIG. 3).

Once users receive their DSL gateway 100 (FIG. 1), they are instructed by documentation or otherwise to plug their DSL gateway into a telephone jack connected to the their telephone lines (circuits) that were provisioned for DSL service by the CLEC/ILEC. This process is as simple as plugging in a telephone handset 110 (FIG. 1). The DSL gateway is then powered on 414.

The DSL Gateway detects a DSL "dial-tone" 416 and thereafter locates 418 a working VPI/VCI pair, as described in U.S. patent application Ser. No. 09/668,623.

The DSL gateway then attempts to contact the DHCP server 144 (FIG. 1) to obtain basic configuration information, such as the assignment of an IP address. On power-up, a minimal TCP/IP environment is loaded and the DSL gateway broadcasts a DHCPDISCOVER message with the value '0000000000,<serial number of gateway>' in the client identifier field, otherwise referred to as "DHCP option 61". The first 10 bytes are the DSL phone number, followed by one byte separator (e.g. ",") and 11 bytes containing the serial number of the DSL gateway. "0000000000" is sent as the phone number until the subscriber/user runs the client setup program and enters his/her phone number.

Because the DSL gateway does not know the address of the DHCP server, it broadcasts 420 the message using a TCP/IP broadcast, with 0.0.0.0 as the source address and 255.255.255.255 as the destination address. The DHCPDIS- COVER message preferably includes the DSL gateway's network hardware address (MAC address), a list of DHCP options the DSL gateway supports, a unique gateway identifier (bi-directional IP communication device identifier), such as a serial number 222 (FIG. 2), and a message identifier that will be used in all messages between the client computer and the server to identify the particular request.

One of the BSN's 136 (FIG. 1) functions is to relay the DHCPDISCOVER requests from the DSL gateway to the appropriate DHCP servers. A special feature of the BSN is that it forwards the DHCPDISCOVER message along with the Slot/Port/VPI/VCI (Slot/Port on the BSN where the circuit is connected) details of the DSL gateway to the DHCP server. This is referred to as "DHCP option 82". The DHCP server preferably matches one static IP address to each Slot/Port/VPI/VCI identifier.

After the DHCP server receives 422 the DHCPDISCOVER message, it looks at the request to see if the DSL gateway configuration request is valid. If the request is valid, the DHCP identifies 424 the individual user, and hence the configuration details or settings for that particular user, as described in further detail below in relation to FIG. 5. The DSL gateway then transmits 426 back a DHCPOFFER message to the DSL gateway that sent the DHCPDISCOVER message and preferably includes basic configuration details 324 (FIG. 3), such as the DSL gateway's IP address, the gateway's LAN and WAN IP addresses, the length of time the lease, the length of time the lease is valid, the IP and MAC addresses of the server that provided the DHCP information, the ISP hostname and DNS information. The DHCPOFFER message is also a TCP/IP broadcast (255.255.255.255), because the DSL gateway does not yet have an addressable IP address. The DHCP server then reserves the IP addresses it sent to the DSL gateway so that the addresses are not offered to another DSL gateway making a similar request. If there is more than one DHCP server on the network, all servers respond to the DHCPDISCOVER message with a DHCPOFFER message.

After the DSL gateway receives 428 the DHCPOFFER message and accepts the IP address, it sends 430 a DHCPREQUEST message to all DHCP servers, indicating that it has accepted an offer. The broadcast message contains the IP address of the DHCP server that made the accepted offer, and all other DHCP servers release the addresses they had offered back into their available address pool.

When the DHCP server that made the successful offer receives 432 the DHCPREQUEST message, it responds to the DSL gateway by sending 434 an acknowledgment broadcast. If the request message is accepted, the DHCP server broadcasts a successful acknowledgment with a DHCPACK message. This message contains a valid lease for the IP address and can contain other configuration information. In a preferred embodiment, the DHCPACK message contains basic configuration details 324 (FIG. 3), such as:

1. An IP address and subnet mask for the DSL gateway's DSL interface;
2. An IP address of a router on the DSL side of the network;
3. The ISP hostname and the DNS that is used to resolve the hostname into an IP address; and
4. For the DSL telephone number model (Bell Atlantic), the IP address and subnet mask for the DSL gateway's LAN interface.

The DSL gateway then preferably checks the value of the LAN IP address from a Vendor Specific or Encapsulated Information field ("DHCP option 43"). Once the DSL gateway has received 436 the DHCPACK message, it finishes initializing its TCP/IP network environment by automatically configuring 438 itself with the information provided by the DHCP server. This may involve automatically rebooting the gateway.

Although not shown, if the request is not successful, possibly because the DSL gateway is trying to lease a previous address that is no longer available, or the IP address is not correct because the DSL gateway is on a different subnet, the DHCP server broadcasts a negative acknowledgment with a DHCPNACK message. If the DSL gateway receives 438 a DHCPNACK message, it starts the DHCP lease process again.

Once the DSL gateway has configured its TCP/IP settings, the DSL gateway sends a ping to the ISP. If the ping is successful, the DSL gateway then transmits 440 a full configuration request to the ISP at the ISP hostname. The full configuration request is for all other configuration details not supplied though the basic configuration of contacting the DHCP server as described above. The ISP hostname may need to be resolved using DNS server information supplied through the basic configuration from the DHCP server. If the ping is unsuccessful, an alarm condition is raised on the gateway.

The ISP then receives 442 the full configuration request and sends 444 the full configuration details back to the DSL gateway. The DSL gateway receives 446 the full configuration information and automatically configures 448 itself using the received full configuration information. This may involve automatically rebooting the gateway.

Figure 5:
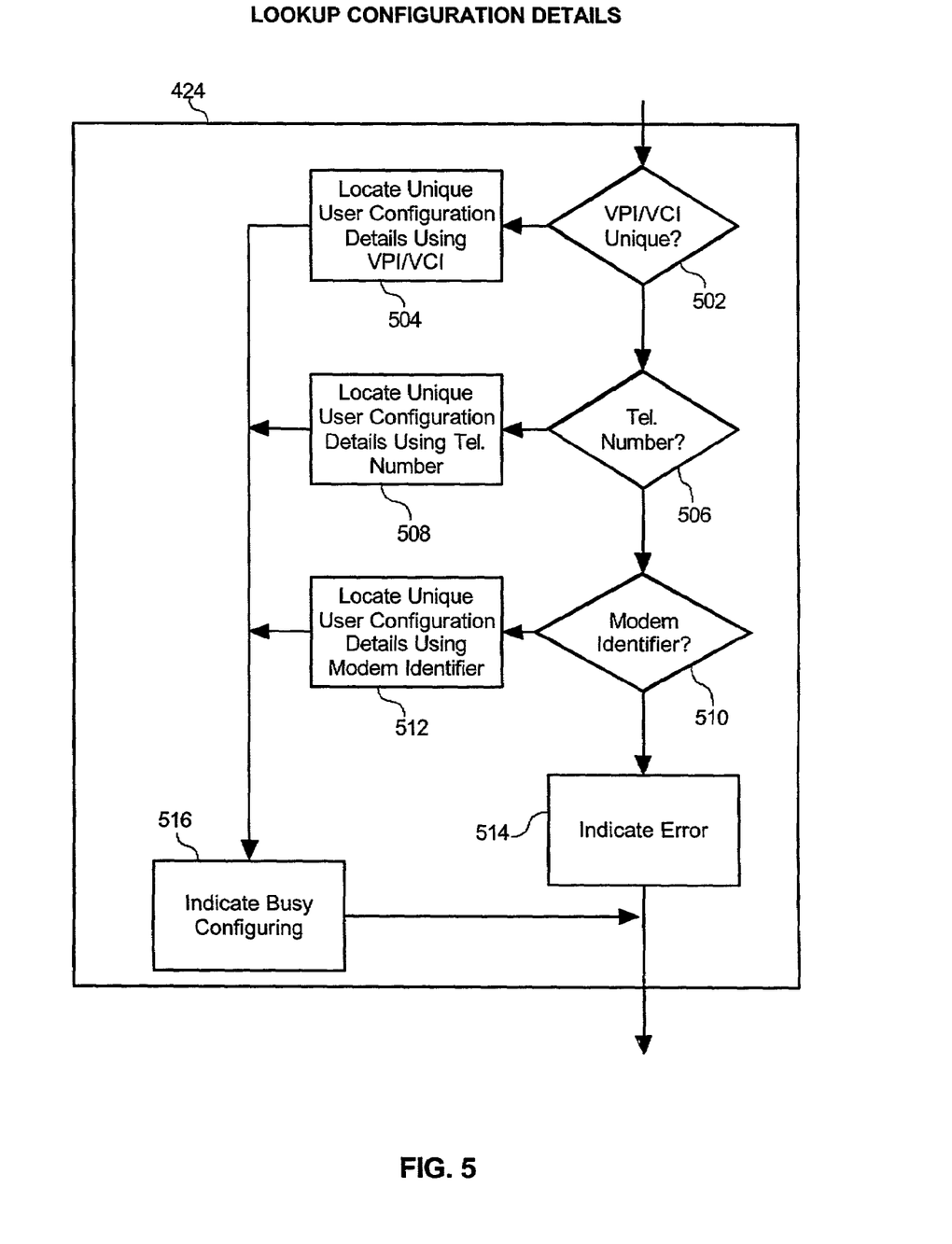
FIG. 5 is a flow chart of the identification 424 step of FIGS. 4A and 4B.

FIG. 5 is a flow chart of the identification 424 step of FIGS. 4A and 4B. After the discover request is received by the DHCP server 144 (FIG. 1), the DHCP server examines the request to determine 502 whether the VPI/VCI pair from where the request came is unique. If the VPI/VCI pair is unique (502-Yes), then the user's unique configuration details associated with the unique VPI/VCI pair are located 504 and transmitted 424 (FIG. 4B) to the DSL gateway. Additionally, prior to transmitting the configuration information the DSL gateway may indicate 516 that it is busy automatically configuring itself, such as by illuminating a green light or LED (Light Emitting Diode).

If the VPI/VCI pair is not unique (502-No), then the DHCP server examines the request to determine 506 whether the request includes a valid telephone number. If a valid telephone number is associated with a unique user in the configuration table, then the user's unique configuration details associated with the valid telephone number are located 508 and transmitted 424 (FIG. 4B) to the DSL gateway. Additionally, prior to transmitting the configuration information the DSL gateway may indicate 516 that it is busy automatically configuring itself, such as by illuminating a green light or LED. It should be appreciated that any unique user identifier may be used instead of the telephone number.

If the request does not contain a telephone number or for some reason the telephone number is invalid (506-No), then the DHCP server examines the request to determine 510 whether the request includes a unique gateway identifier associated with a unique user, such as a serial number.

It should be stressed that the unique gateway identifier is not merely a MAC address, but rather a unique number, such as a serial number, that has been associated with a specific and unique gateway and therefore a specific and unique user. As described above in relation to FIG. 4A (402-406), this association usually occurs at the time that an order for a DSL gateway is received. The DSL gateway's unique serial number is associated with a unique individual user to whom the DSL gateway was shipped.

If a unique gateway identifier is associated with a unique user in the configuration table, then the user's unique configuration details are located 512 and transmitted 424 (FIG. 4B) to the DSL gateway. Additionally, prior to transmitting the configuration information, the DSL gateway may indicate 516 that it is busy automatically configuring itself, such as by illuminating a green light or LED.

If the request does not contain a gateway identifier, or the unique gateway identifier is not associated with a unique user in the configuration table, then the DSL gateway indicates to the user that there is a configuration error, such as by illuminating a red light or LED, to prompt the user to contact the ISP's technical support.

The above described process is undertaken by the communication procedures 216 (FIG. 2) and 316 (FIG. 3) as well as the DHCP procedures 218 (FIG. 2) and 318 (FIG. 3).

The above described system has the advantage of ensuring backward compatibility with DSL gateways already deployed that did not have unique serial numbers saved within their database. With these gateways, the VPI/VCI pair or telephone number approaches will still work.

Additionally, the software on the DSL gateway no longer needs to prompt users for their telephone numbers. Additionally, the installation documentation can be simplified for all operating systems to take into account this change.

The above described simplified configuration allows much simpler installation procedures, for example:

a. For client computers with ISP branded settings, the client computer is plugged into the DSL gateway, the user waits for a green light, installs Windows Client computer software (choosing Ethernet, USB or Parallel ports and rebooting). The user can then access the Internet with ISP branded client computer settings.

b. For client computers with pre-installed Ethernet cards, the client computer is plugged into the DSL gateway, the user waits for a green light, the client computer is turned on, and the user can access the Internet without the ISP branded client computer settings.

c. For an APPLE IMAC, the DSL cables are plugged into the DSL gateway and the IMAC, the user waits for a green light, the IMAC is turned on, and the user can navigate the Internet.

D. For client computers with LINUX, the DSL cables are plugged into the DSL gateway and client computer, the user waits for a green light, the client computer is turned on, and the user can navigate the Internet.

This simplified configuration model also allows much simpler failure and/or debugging procedures for technical support. For example if after plugging in the DSL gateway cables, the customer gets a red failure light, it immediately signifies a network side provisioning problem. However, if after plugging in the DSL gateway cables, the customer gets a green light and still can't access the Internet, this immediately signifies a client computer configuration or local LAN problem.

While the foregoing description and drawings represent preferred embodiments of the present invention, it will be understood that various additions, modifications and substitutions may be made therein without departing from the spirit and scope of the present invention as defined in the accompanying claims. In particular, it will be clear to those skilled in the art that the present invention may be embodied in other specific forms, structures, arrangements, proportions, and with other elements, materials, and components, without departing from the spirit or essential characteristics thereof. The presently disclosed embodiments are therefore to be considered in all respects as illustrative and not restrictive, the scope of the invention being indicated by the appended claims, and not limited to the foregoing description. Furthermore, it should be noted that the order in which the process is performed may vary without substantially altering the outcome of the process.

What is claimed is:

1. A method for automatic configuration of a bi-directional Internet Protocol (IP) communication device to establish an Internet connection, comprising:
    automatically broadcasting a request from a bi-directional Internet Protocol (IP) communication device selected from either a DSL gateway or cable modem for basic configuration details for the IP communication device over an IP network to the Internet and a remote server connected thereto, where said request contains a MAC address and a unique bi-directional IP communication device identifier stored in the IP communication device and associated with a unique user at the server prior to configuration;
    receiving said basic configuration details including an IP address from the server at said device, where said basic configuration details are assigned to said unique user based on said unique bi-directional IP communication device identifier; and
    automatically configuring itself said bi-directional IP communication device with said basic configuration details to establish an Internet connection.

2. The method of claim 1, wherein said remote server is a Dynamic Host Configuration Protocol (DHCP) server.

3. The method of claim 2, wherein said receiving comprises obtaining said IP address from said DHCP server.

4. The method of claim 2, wherein the address of the DHCP server is unknown to the IP communication device said broadcasting comprises broadcasting a DHCP Discover request using a TCP/IP broadcast.

5. The method of claim 4, wherein said DHCP server validates the request, said receiving comprises acquiring a DHCP Offer message from the DHCP server broadcast as a TCIP/IP broadcast and accepting the IP address.

6. The method of claim 5, further comprising, prior to said configuring step, the steps of:
    sending a DHCP Request message to at least the DHCP server; and
    receiving a DHCP acknowledge message from said DHCP server.

7. The method of claim 1, further comprising transmitting a configuration request for additional configuration details.

8. The method of claim 7, further comprising receiving said additional configuration details specific to said unique user.

9. The method of claim 8, further comprising configuring said bi-directional IP communication device with said additional configuration details.

10. The method of claim 1, further comprising, before said broadcasting step, the steps of:
    connecting said bi-directional IP communication device to a communication line; and
    powering said bi-directional IP communication device on.

11. The method of claim 10, further comprising, before said broadcasting step, the step of automatically detecting a communication circuit over said communication line.

12. The method of claim 1, further comprising, before said broadcasting step, the step of automatically determining Permanent Virtual Circuit (PVC) details for communications between said bi-directional IP communication device and a communications network.

13. The method of claim 12, wherein said determining comprises the step of ascertaining a VPINCI (Virtual Path Identifier/Virtual Channel Identifier) pair for said communications.

14. The method of claim 1, wherein said broadcasting and receiving steps occur automatically without any communication between said bi-directional IP communication device and a client computer coupled to said bi-directional IP communication device.

15. The method of claim 1, further comprising, prior to said configuring step, the steps of:
  assigning said unique bi-directional IP communication device identifier to said bi-directional IP communication device and storing the identifier therein;
  associating said unique bi-directional IP communication device identifier with said unique user; and
  storing the unique device identifier, the associated unique user and the basic configuration details in the server.

16. The method of claim 15, further comprising generating a configuration table listing bi-directional-IP communication device identifiers, associated users and each user's basic configuration details.

17. The method of claim 1, wherein a configuration table listing device identifiers, their associated users, and each user's basic configuration details is stored in the server.

18. A bi-directional IP communication device, comprising:
  a Central Processing Unit (CPU);
  communication circuitry;
  input/output ports; and
  a memory containing:
    a unique bi-directional IP communication device identifier for a DSL gateway or cable modem;
    instructions for automatically broadcasting a request from the device for basic configuration details for the IP communication device, where said request contains a MAC address and a unique bi-directional IP communication device identifier associated with a unique user at a server prior to configuration;
    instructions for receiving said basic configuration details including an IP address from the server, where said basic configuration details is assigned to said unique user based on said unique bi-directional IP communication device identifier; and
    instructions for automatically configuring said bi-directional IP communication device with said basic configuration details to establish an Internet connection.

19. The bi-directional IP communication device of claim 18, wherein the address of the server is unknown to the IP communication device, said instructions for broadcasting further comprise instructions for broadcasting said request for basic configuration details using a TCP/IP broadcast.

20. A computer program product for use in conjunction with a a bi-directional Internet Protocol (IP) communication device for the automatic configuration thereof, the computer program product comprising a computer readable storage and a computer program stored therein, the computer program comprising:
  instructions for automatically broadcasting a request from a bi- directional Internet Protocol (IP) communication device selected from either a DSL gateway or cable modem for basic configuration details for the IP communication device, where said request contains a MAC address and a unique bi-directional IP communication device identifier stored in the IP communication device and associated with a unique user at a server prior to configuration;
  instructions for receiving said basic configuration details including an IP address from a server at said device, where said basic configuration details is assigned to said unique user based on said unique bi-directional IP communication device identifier; and
  instructions for automatically configuring said bi-directional IP communication device with said basic configuration details to establish an Internet connection.

21. The computer program product of claim 20, wherein the address of the server is unknown to the IP communication device, said instructions for broadcasting further comprise instructions for broadcasting said request for basic configuration details using a TCP/IP broadcast.

22. A method for the automatic configuration of a bi-directional Internet Protocol (IP) communication device, comprising:
  associating users of bi-directional Internet Protocol (IP) communication devices selected from either a DSL gateway or cable modem with respective unique device identifiers;
  storing a configuration table listing the unique device identifiers, their associated users and each user's basic configuration details in a server;
  connecting a user's unconfigured bi-directional IP communication device to a communication line, said device having the unique device identifier stored therein that is associated at the server with the user prior to connection;
  automatically broadcasting a request using a TCP/IP broadcast from the IP communication device for basic configuration details for the IP communication device over the communication line to the server, where said request contains a MAC address and the unique device identifier;
  receiving at said device a TCP/IP broadcast message from the server with said basic configuration details including an IP address, where said basic configuration details for the IP communication device are assigned to said unique user based on said unique device identifier; and
  automatically configuring said IP communication device with said basic configuration details to establish an Internet connection.

23. The method of claim 22, further comprising, before said broadcasting step, the step of automatically detecting a dial-tone for the internet protocol.

24. A method for the automatic configuration of a bi-directional Internet Protocol (IP) communication device, comprising:
  providing a bi-directional Internet Protocol (IP) communication device selected from either a DSL gateway or cable modem having a MAC address and a unique device identifier stored therein;
  associating the device identifier with a user identifier for a unique user of the IP communication device;
  providing the IP communication device to the unique user;
  providing the device identifier and the user identifier to an internet service provider (ISP);
  generating a configuration table listing device identifiers, their associated users, and each user's basic configuration details including an IP address;
  storing the configuration table in a server;
  connecting the IP communication device to a network at a user site;

automatically broadcasting a request from the IP communications device for basic configuration details for the IP communication device to the server over the network, where said request contains the MAC address and the unique device identifier;

identifying the user's basic configuration details in the configuration table from the device identifier;

transmitting the basic configuration details to the user site IP communications device;

receiving said basic configuration details at said IP communication from the server; and automatically configuring said IP communication device with said basic configuration details.

25. The method of claim 24, further comprising, before said broadcasting step, the step of automatically detecting a dial-tone for the internet protocol.

* * * * *